(12) United States Patent
Levin et al.

(10) Patent No.: US 10,169,485 B2
(45) Date of Patent: Jan. 1, 2019

(54) DYNAMIC PARTITIONING OF GRAPH DATABASES BASED ON EDGE SAMPLING

(71) Applicant: INTERNATIONAL BUSINESS MACHINES CORPORATION, Armonk, NY (US)

(72) Inventors: Roy Levin, Zihron Yakov (IL); Inbal Ronen, Haifa (IL); Arnon Yogev, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 14/845,369

(22) Filed: Sep. 4, 2015

(65) Prior Publication Data

US 2017/0068746 A1 Mar. 9, 2017

(51) Int. Cl.
*G06F 17/30* (2006.01)

(52) U.S. Cl.
CPC .. *G06F 17/30958* (2013.01); *G06F 17/30584* (2013.01)

(58) Field of Classification Search
None
See application file for complete search history.

(56) References Cited

U.S. PATENT DOCUMENTS 5,515,531 A * 5/1996 Fujiwara ........... G06F 17/30321
8,645,339 B2 2/2014 Kang et al.
2012/0317142 A1 12/2012 Broecheler et al.
2014/0280143 A1 9/2014 Milenova et al.
2014/0280360 A1 9/2014 Webber et al.
2014/0320497 A1 10/2014 Vojnovic et al.

OTHER PUBLICATIONS

Averbuch et al., Partitioning Graph Databases: A Qualitative Evaluation Jan. 23, 2013, arXiv, https://arxiv.org/pdf/1301.5121.pdf.*
Gehweilder et al., A distributed diffusive heuristic for clustering a virtual P2P supercomputer May 2010, Parallel & Distributed Processing, Workshops and Phd Forum (IPDPSW), 2010 IEEE International Symposium on, 1-10.*
Black, graph (data structure) Jul. 28, 2014 (captured by archive.org on Sep. 1, 2014), NIST, https://web.archive.org/web/20140901002535/https://xilinux.nist.gov/dads/HTML/graph.html.*

(Continued)

*Primary Examiner* — Jason G Liao
(74) *Attorney, Agent, or Firm* — William H. Hartwell (57) ABSTRACT

Software that uses data collected from queries performed on a graph database to dynamically improve graph partitioning. The software performs the following operations: (i) identifying a partitioned graph database including a set of edges and a set of vertices, wherein each vertex of the set of vertices is associated with one or more edges of the set of edges; (ii) determining an edge traversal value for one or more edges of the set of edges, wherein the edge traversal value for a respective edge relates to a number of times that the respective edge is traversed in response to one or more queries of the graph database; and (iii) calculating a first vertex score for a first vertex on a first graph partition, based, at least in part, on the edge traversal value(s) for one or more edges associated with the first vertex.

12 Claims, 4 Drawing Sheets

(56) References Cited

OTHER PUBLICATIONS

Trip, Partitioned Tables and Indexes in SQL Server 2005, microsoft. com, https://technet.microsoft.com/en-us/library/ms345146(v=sql.90).aspx.*
Oracle® Communications Billing and Revenue Management System Administrator's Guide Release 7.5 2011, Oracle, Chapter 20.*
Abadi et al.; "Scalable Semantic Web Data Management Using Vertical Partitioning"; VLDB '07, Sep. 23-28, 2007, Vienna, Austria; Copyright 2007, VLDB Endowment, ACM; pp. 411-422.
Curino et al.; "Schism: a Workload-Driven Approach to Database Replication and Partitioning"; Proceedings of the VLDB Endowment, vol. 3, No. 1; Copyright 2010, VLDB Endowment; pp. 48-57.
Garey et al.; "Some simplified NP-complete problems"; STOC '74, Proceedings of the sixth annual ACM symposium on Theory of computing, New York, NY,1974; pp. 47-63.
Min et al.; "Inter-Data-Center Large-Scale Database Replication Optimization—A Workload Driven Partitioning Approach"; H. Decker et al. (Eds.): DEXA 2014, Part II, LNCS 8645, pp. 417-432,2014; © Springer International Publishing Switzerland.
Mondal et al.; "Managing Large Dynamic Graphs Efficiently"; SIGMOD '12, May 20-24, 2012, Scottsdale, Arizona; Copyright 2012, ACM; pp. 145-156.
Nehme et al.; "Automated Partitioning Design in Parallel Database Systems"; SIGMOD'11, Jun. 12-16, 2011, Athens, Greece; Copyright 2011, ACM; pp. 1137-1148.
Pietzuch et al.; "Hermes: A Distributed Event-Based Middleware Architecture"; ICDCSW '02; Proceedings of the 22nd International Conference on Distributed Computing Systems Workshops; © 2002, IEEE; pp. 611-618.
Rao et al.; "Automating physical database design in a parallel database"; SIGMOD Jun. 4-6, 2002, Madison, Wisconsin; Copyright 2002, ACM; pp. 558-569.
Stanton et al.; "Streaming graph partitioning for large distributed graphs"; KDD'12, Aug. 12-16, 2012, Beijing, China; Copyright 2012 ,ACM; pp. 1222-1230.
Tsourakakis et al.; "FENNEL: streaming graph partitioning for massive scale graphs"; WSDM'14, Feb. 24-28, 2014, New York, NY; Copyright 2014, ACM; pp. 333-342.
Vaquero et al.; "xDGP: A Dynamic Graph Processing System with Adaptive Partitioning"; arXiv:1309.1049v3 [cs.DC] Sep. 10, 2013; pp. 1-13.
Walshaw, Chris; "The Graph Partitioning Archive"; Printed on: Jun. 18, 2015; pp. 1-16; <http://staffweb.cms.gre.ac.uk/~wc06/partition/>.
Yang et al.; "Towards Effective Partition Management for Large Graphs"; SIGMOD'12, May 20-24, 2012, Scottsdale, Arizona; Copyright 2012, ACM; pp. 517-528.
"Graph Partition"; Wikipedia, the free encyclopedia; last modified on Mar. 16, 2015; Printed on: Jun. 18, 2015; pp. 1-5; <https://en.wikipedia.org/wiki/Graph_partition>.

* cited by examiner

DYNAMIC PARTITIONING OF GRAPH DATABASES BASED ON EDGE SAMPLING

BACKGROUND

The present invention relates generally to the field of databases, and more particularly to graph database partitioning.

Graph databases are known. A graph database is a database that uses graph structures for semantic queries. Graph databases can use nodes, edges, and/or properties to represent and store data. Generally speaking, nodes typically represent entities, properties are typically information relating to the nodes, and edges are typically lines that connect nodes to entities or nodes to properties. When a graph database is queried, one or more edges may be traversed in order to determine the result to the query.

Common uses for graph databases include online social networks and linked data. In some cases, graph databases may be partitioned across multiple devices (typically in a cluster), where the process of organizing the graph across multiple devices is generally referred to as graph partitioning.

SUMMARY

According to an aspect of the present invention, there is a method, computer program product and/or system that performs the following operations (not necessarily in the following order): (i) identifying a partitioned graph database including a set of edges and a set of vertices, wherein each vertex of the set of vertices is associated with one or more edges of the set of edges; (ii) determining an edge traversal value for one or more edges of the set of edges, wherein the edge traversal value for a respective edge relates to a number of times that the respective edge is traversed in response to one or more queries of the graph database; and (iii) calculating a first vertex score for a first vertex on a first graph partition, based, at least in part, on the edge traversal value(s) for one or more edges associated with the first vertex.

DETAILED DESCRIPTION

When a graph database is partitioned across multiple machines in a cluster, the workload in response to a database query may be unevenly balanced across those machines. For example, a single query on the database may require traversals between several machines. Embodiments of the present invention use data collected from queries performed on a graph database to dynamically improve graph partitioning, migrating vertices between machines in order to reduce overhead and increase the overall efficiency of the database. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
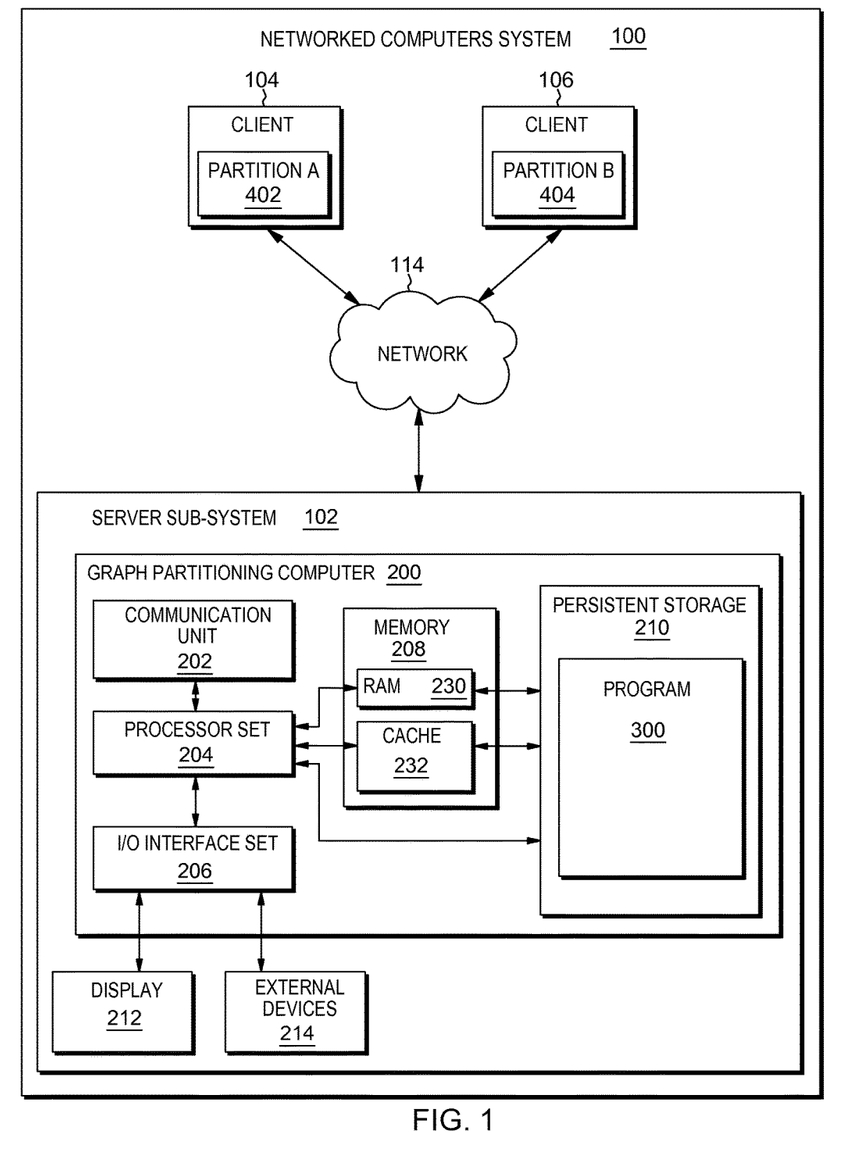
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-system 104; graph partition A 402; client sub-system 106; graph partition B 404; communication network 114; graph partitioning computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with graph partitioning computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
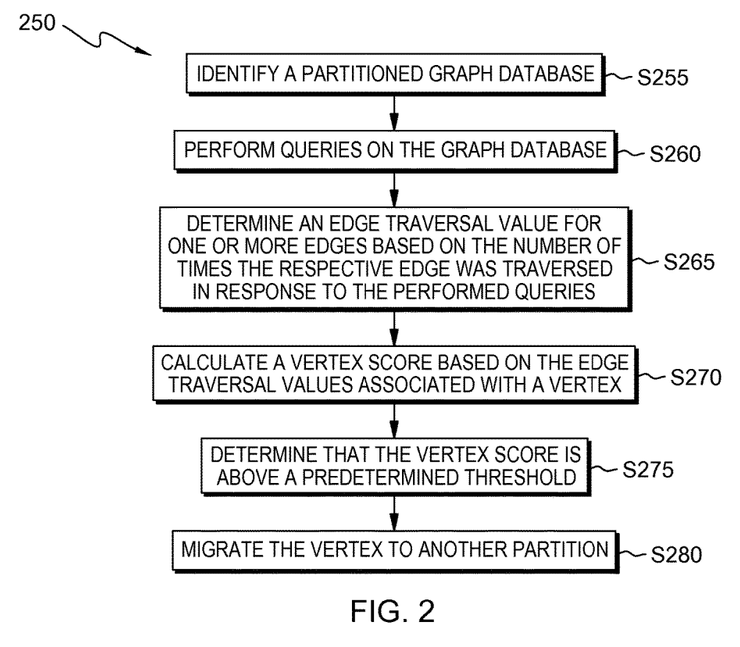
FIG. 2 is a flowchart showing a first embodiment method performed, at least in part, by the first embodiment system.
Figure 3:
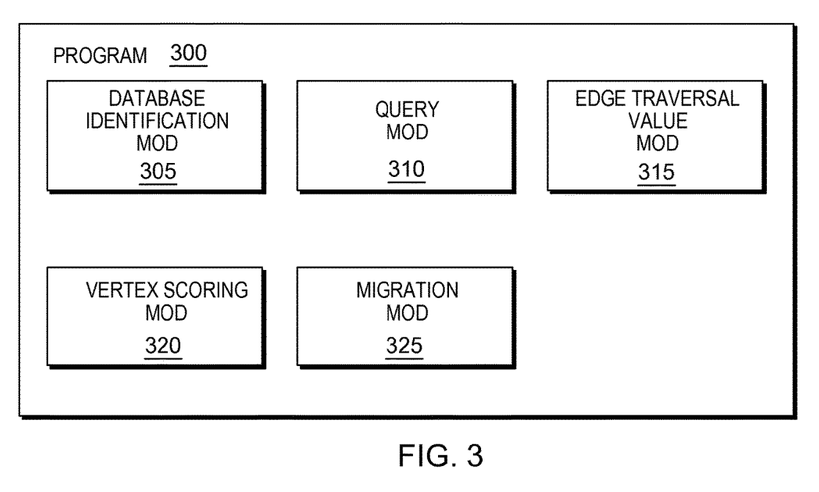
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Processing begins at operation S255, where database identification module ("mod") 305 identifies a partitioned graph database. The partitioned graph database includes a set of edges and a set of vertices, where each vertex of the set of vertices is associated with (or "connected to") one or more edges of the set of edges. The partitioned graph database further includes a set of partitions, where each partition includes one or more of the vertices. The edges are used to connect the vertices (or "nodes") to each other, where some of the edges are intrapartition edges (that is, edges between nodes in the same partition), and some edges are interpartition edges (that is, edges between nodes in different partitions).

The partitions of the partitioned graph database may be any of a wide variety of graph database subcomponents known (or yet to be known) in the art. In some embodiments, graph partitions are located in separate portions of a hard drive (such as persistent storage 210 in graph partitioning computer 200). In other embodiments, the partitions are located on separate physical and/or virtual computers, and are connected via a clustered computing environment. In the present example embodiment, the partitioned graph database includes two partitions: partition A 402 and partition B 404, where partition A 402 is located within client sub-system 104 and partition B 404 is located within client sub-system 106 of networked computers system 100 (see FIG. 1). However, this is not meant to be limiting, and the partitioned graph database may be configured in many known (or yet to be known) ways.

Figure 4A:
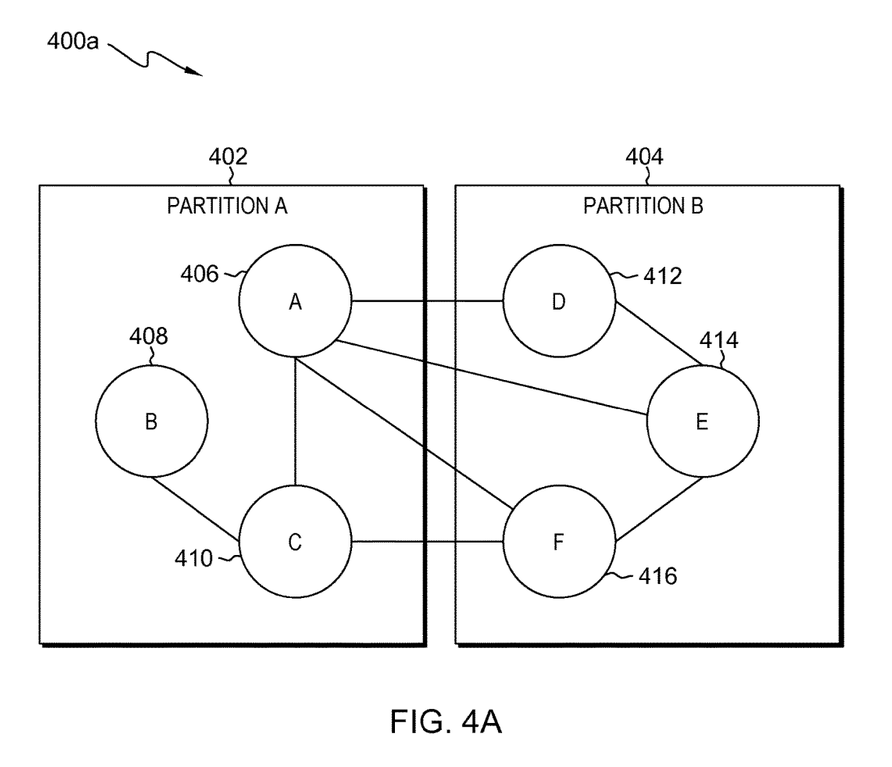
FIG. 4A is a diagram depicting a partitioned graph database prior to node migration, according to an embodiment of the present invention.

In the present example embodiment, the partitioned graph database represents social media connections of various users of a social media network (also referred to as a "social network"), where nodes represent the various users, and where edges represent social media connections between users. Diagram 400*a* (see FIG. 4A) depicts a visual representation of this graph database. Referring to FIG. 4A, diagram 400*a* depicts the two partitions of the partitioned graph database: partition A 402 and partition B 404. Each partition includes three nodes. Partition A 402 includes node A 406, node B 408, and node C 410, and partition B includes node D 412, node E 414, and node F 416. Table 1, below, shows the social media connections represented by the edges in FIG. 4A, where "Y" indicates that two users (represented by their corresponding node letters) are connected via the social media network, and where "N" indicates that two users are not connected via the social media network. Some examples of the connection relationships shown in Table 1 (and represented by the nodes and edges in FIG. 4A)

include, but are not limited to: (i) user "A" and user "B" are not connected; (ii) user "C" and user "F" are connected; and (iii) user "D" and user "E" are connected.

TABLE 1

Social Media Connections

| Node | A | B | C | D | E | F |
|------|---|---|---|---|---|---|
| A | N/A | N | Y | Y | Y | Y |
| B | N | N/A | Y | N | N | N |
| C | Y | Y | N/A | N | N | Y |
| D | Y | N | N | N/A | Y | N |
| E | Y | N | N | Y | N/A | Y |
| F | Y | N | Y | N | Y | N/A |

Processing proceeds to operation S260, where query mod 310 performs one or more queries on the graph database. As used herein, a query is any request for information that is included in the partitioned graph database. In some embodiments, queries are written in a query language such as SQL (structured query language). In other embodiments, queries include the selection of parameters from a menu. In still other embodiments, queries are in the form of query by example (QBE) queries. In the present example embodiment, queries are presented in natural language, and generally relate to the "connection information" of various users of the social media network. In other words, the queries of the present example include natural language questions relating to who a social media user's connections are (for example, "who are the connections of user A?").

When a query is performed on the graph database, query mod 310 traverses various nodes and/or edges of the graph database in order to answer the query. For example, in the present embodiment, for a query of "who are the connections of user A?", mod 310 would begin with node A 406 and traverse each edge connected to (that is, associated with) node A 406 to determine user A's connections. As a result, mod 310 would traverse the edges between node A 406 and the following nodes: (i) node D 412; (ii) node E 414; (iii) node F 416; and (iv) node C 410. In another example according to the present embodiment, a query of "who are the $2^{nd}$ degree connections of user A?" would return all users who are two or fewer edges (or "steps") away from user A. Query mod 310 would begin with node A 406, traverse each edge attached to node A 406 to reach user A's connections, and then traverse each edge attached to the nodes of user A's connections to reach user A's $2^{nd}$ degree connections.

In the present example, a total of six queries are performed on the graph database during operation S260: (i) "who are the connections of user A?"; (ii) "who are the connections of user D?"; (iii) "who are the connections of user F?"; (iv) "who are the $2^{nd}$ degree connections of user B?"; (v) "who are the connections of user C?"; and (vi) "who are the connections of user A?" These queries are performed in response to requests by various users of the social network. That is, the queries are the result of user requests performed by users of the social network—such as searches in a user search field—while the social network is operational. The implications of these queries (including the edges traversed as a result of performing the queries) will be discussed in further detail, below.

Processing proceeds to operation S265, where edge traversal value mod 315 determines an edge traversal value (also referred to as an "edge count") for one or more of the edges. In certain embodiments, the edge traversal value is based on a number of times the respective edge was traversed in response to the performed queries. In fact, in some embodiments, the edge traversal value for an edge is equal to the number of times the respective edge was traversed in response to the queries. However, this is not always the case. In some embodiments, for example, only certain edges (or edge traversals) are counted. Additionally, in other embodiments, the edge traversal value represents a percentage or portion of traversals that take place over a particular edge. For example, see the discussion of sampling rates in the Further Comments and/or Embodiments sub-section of this Detailed Description section, below. These examples are not meant to be limiting, however, and the edge traversal values determined by mod 315 may include any values that relate to edge traversals performed on the graph database.

In the present example embodiment, edge traversal values are equal to the number of times a respective edge was traversed in response to the performed queries. The edge traversal values resulting from the queries described above (that is, the queries performed in the present example during step S260) are depicted in Table 2, below. In Table 2, the edge traversal value for a given edge is shown at the intersection of the edge's respective node letters in the table. For example, the edge between node A 406 and node C 410 has an edge traversal value of 4, and the edge between node B 408 and node C 410 is 2.

TABLE 2

Edge Traversal Values

| Node | A | B | C | D | E | F |
|------|---|---|---|---|---|---|
| A | N/A | N/A | 4 | 3 | 2 | 3 |
| B | N/A | N/A | 2 | N/A | N/A | N/A |
| C | 4 | 2 | N/A | N/A | N/A | 3 |
| D | 3 | N/A | N/A | N/A | 1 | N/A |
| E | 2 | N/A | N/A | 1 | N/A | 1 |
| F | 3 | N | 3 | N/A | 1 | N/A |

Processing proceeds to operation S270, where vertex scoring mod 320 calculates a vertex score based on the edge traversal values for one or more edges associated with a vertex (or node). The vertex score may be calculated in a wide variety of ways, some of which are discussed below in the Further Comments and/or Embodiments sub-section of this Detailed Description section. In the present example embodiment, the vertex score for a node is equal to the sum of all edge traversal values for interpartition edges connected to that node. In other words, in the present example, the vertex score for a node is a number equal to the total number of times that query mod 310, in responding to the one or more queries, traversed an edge connecting the node to a node in another partition. So, in the present example, only interpartition edges are considered when calculating vertex scores. Specifically, the following interpartition edges are considered (where edges are referred to using the node letters of the nodes they connect): (i) for node A 406, edges AD, AE, and AF; (ii) for node B 408, none (node B has no connected interpartition edges); (iii) for node C 410, edge CF; (iv) for node D 412, edge AD; (v) for node E 414, edge AE; and (vi) for node F 416, edges AF and CF. The resulting vertex scores according to the present example are depicted below in Table 3.

TABLE 3

Vertex scores
(Based on the Edge Traversal Values of Interpartition Edges)

|   | Score |
|---|---|
| A | 8 |
| B | 0 |
| C | 3 |
| D | 3 |
| E | 2 |
| F | 6 |

In some embodiments, the vertex score includes an "inbalance score" representing an amount of balance between the partitions of the partitioned graph database. The inbalance score may include a predictive element, indicating an anticipated effect of transferring a given vertex to a different partition. The inbalance score may be used as the vertex score itself, or the inbalance score may be combined with other elements (such as edge traversal values, discussed above). For additional discussion of inbalance scores according to the present invention, see the Further Comments and/or Embodiments subsection of this Detailed Description.

Processing proceeds to operation S275, where migration mod 325 determines that the vertex score is above a predetermined threshold. The threshold may be any value which may be helpful in determining whether a given vertex should be migrated to another partition on the graph. For example, in certain embodiments, interpartition edge traversals may take more time (or be more resource intensive) than intrapartition edge traversals. As such, it may be desired to reduce the number of interpartition edge traversals that occur as the result of queries of a graph database. Therefore, when a vertex score based on interpartition edge traversal values is relatively high, then it may be helpful to migrate the respective node to another partition in order to reduce the number of interpartition edge traversals that occur. In certain embodiments, the predetermined threshold is set by a user. In other embodiments, the predetermined threshold is determined automatically by program 300 using machine learning and/or other methods. Furthermore, in certain embodiments: (i) the threshold is a percentage; (ii) the threshold is a formula; and/or (iii) the threshold is an integer. In the present example embodiment, the vertex score threshold is 6. As such, the only vertex with a score above the threshold is node A 406 (which has a vertex score of 8).

Figure 4B:
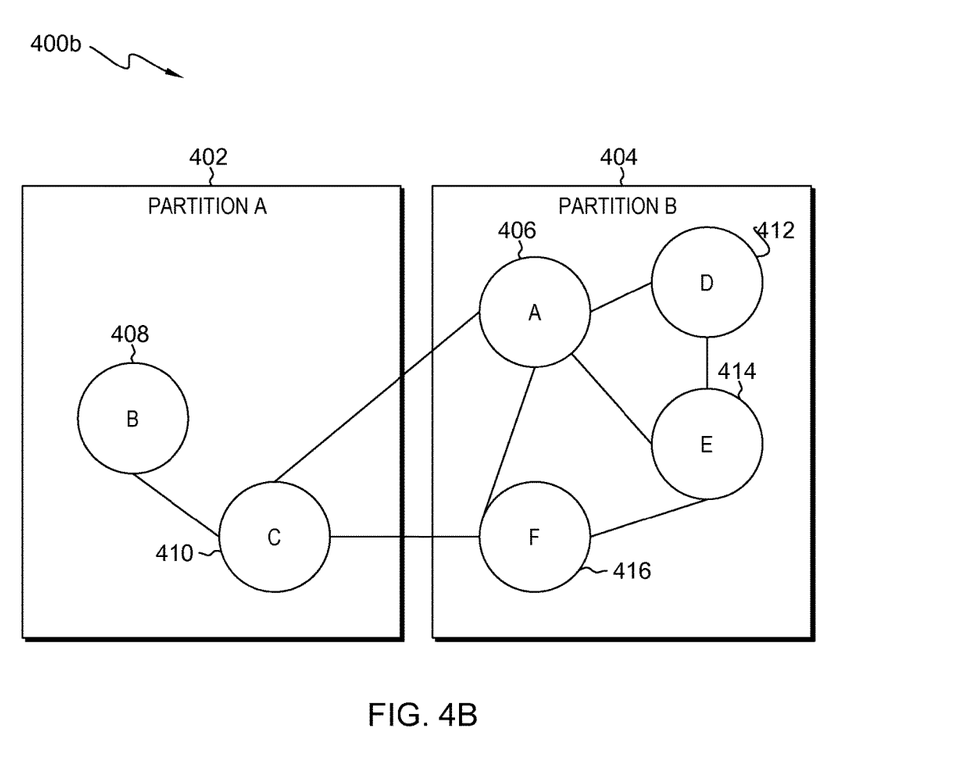
FIG. 4B is a diagram depicting the partitioned graph database after node migration, according to an embodiment of the present invention.

Processing proceeds to operation S280, where, responsive to determining that the vertex score is above the predetermined threshold, migration mod 325 migrates the vertex to another graph partition (for example, from a first graph partition to a second graph partition). Diagram 400b (see FIG. 4B) depicts an example of the partitioned graph database of the present example embodiment after the migration of node A 406. As shown in FIG. 4B, by migrating node A 406 to partition B 404, migration mod 325 has reduced the number of interpartition edges by 50% (from 4 to 2). Furthermore, if the previously performed queries were performed again using the configuration depicted in FIG. 4B, the vertex score for node A 406 would be reduced from 8 to 3, indicating an improved location for node A 406.

In some embodiments, migration mod 325 may perform the migration of operation S280 according to criteria other than just the vertex score meeting a threshold. For example, in some embodiments, nodes are migrated according to a set of priorities (see the Further Comments and/or Embodiments sub-section, below). However, this is not meant to be limiting, and the decision to migrate a node may include a wide variety of known (or yet to be known) factors, as long as at least one of the included factors is based on the edge traversal values discussed herein.

In many embodiments, the operations depicted in flowchart 250 occur repeatedly throughout the operation of the graph database. That is, in these embodiments, program 300 continuously monitors the nodes of partition A 402 and partition B 404 as queries are performed on the database in order to determine when to migrate (or recommend migrating) nodes in the database. Furthermore, in certain embodiments, migration mod 325 operates in parallel with (or orthogonally to) the other modules of program 300, as opposed to sequential operation. For example, operations S275 and S280 may be performed at the same time as the edge sampling and vertex scoring of operations S265 and S270, respectively. As a result of this dynamic partitioning of the graph database, program 300 is able to continuously improve and optimize the performance of the graph database over time.

III. FURTHER COMMENTS AND/OR EMBODIMENTS

Some embodiments of the present invention recognize the following facts, potential problems and/or potential areas for improvement with respect to the current state of the art: (i) in recent years, graph databases have drawn more and more attention from both industry and academia, in part due to the proliferation of online social networks and linked data; (ii) in many cases, it is no longer possible to effectively store a graph database on a single machine; (iii) many graph database systems provide only basic partitioning strategies such as randomized partitioning or partitioning based on transactional affinity; (iv) existing graph partitioning policies do not examine database queries, but rather only graph structure; and/or (v) existing partitioning policies are designed to optimize partitioning for a given graph at a given time—that is, they do not consider dynamic, live migration of a graph over time. Furthermore, existing partitioning techniques based on heuristics which either place a newly arrived vertex in the cluster with the largest number of neighbors or in the cluster with the least number of non-neighbors (or some combination thereof) provide suboptimal partitioning, resulting in poor query processing, as each query may issue traversals that require data residing on multiple machines or unevenly balance the workload among different machines.

Some embodiments of the present invention may include one, or more, of the following features, characteristics and/or advantages: (i) dynamically partitioning a graph database over time while the graph is active (ii) partitioning a graph without requiring a pre-defined graph schema; (iii) providing a temporal aspect which allows for a graph to be partitioned in multiple ways, depending on the recent use of the graph; (iv) including actual database queries on the graph as a factor in partitioning; (v) using edge-based statistics for determining node scores; (vi) dynamically adding new nodes to a graph; and/or (vii) partitioning a graph database across a set of machines in a cluster.

Certain embodiments of the present invention, when partitioning a graph database, utilize the graph's structure as well as the queries that are run against it, constantly improving graph partitioning by migrating vertices between machines as needed. This can be performed with minimal performance overhead, for example, by allowing a graph to continue to process user queries while the profile and migration are taking pace.

Certain embodiments of the present invention monitor edge traversals of a graph database by using a triggering method. The triggering method can utilize various techniques, including database triggers and/or aspect oriented programming. Edge counts based on the traversals are then collected, where the counts are either actual counts or based on a sampling rate. For example, in an embodiment with a relatively active graph (for example, a graph with many queries), a sampling rate of 1/1000 may be used, for performance reasons. That is, in order to increase performance by reducing the total number of data collections and/or the amount of data collected, one in every one thousand edge traversals is sampled. This is certainly not meant to be limiting, however. In other embodiments, sampling rates (or "ratios") of 1/100, 1/10, or 1/1 may be used, for example. In some embodiments, edge sample counts are stored as hidden properties of the edges. The graph partitioner, which is constantly running, examines the hidden edge count properties when processing the graph.

Certain embodiments of the present invention continuously migrate vertices between machines based on priorities. Priorities can be calculated based on how much it is estimated that vertex locality and balancing can be improved by migrating the vertex from its current machine to some other machine. This process continues while the graph database is enabled (or "online") and processing user queries.

In some embodiments, vertices are sorted according to how "improperly placed" they are, where the "misplacement" of a vertex is defined as the delta between its current placement and its best possible placement. In an embodiment, for each vertex, a graph partitioner sums the count of edges connected to that vertex that cross machines. This is also done for every machine which the vertex could be placed, as well as its current machine. The graph partitioner also incorporates a penalty based on the number of vertices and edges on a machine (to avoid placing too many vertices on a single machine). The vertex is then migrated to its optimal machine and the "inbalance score" of all of its adjacent vertices are updated according to the new placement. Generally speaking, the inbalance score may be any score which represents an amount of balance (or lack thereof) amongst partitions of a partitioned graph database. In certain embodiments, the inbalance score reflects how much transferring a vertex from one partition to another partition will hurt the balancing of the graph database. In some embodiments, all vertices in a partition might have the same inbalance score. In other embodiments, the inbalance score may be vertex-specific. The process of migrating vertices and updating inbalance scores may continue constantly while the graph database is processing user queries.

In some embodiments, edge counts can use TTLs (that is, "Time To Live" mechanisms that limited the lifespan of data in a computer or network) to reset the edge counts once they have become outdated. That is, the relevancy of an edge count may decrease over time, requiring the edge count to be reset once it reaches a certain age. In this way, the partitioner can ensure that only recent workloads affect the partitioning.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    identifying, by one or more processors, a graph database partitioned across multiple computers in a clustered computing environment, wherein the graph database includes, as data structures for storing data in the database, a set of graph database edges and a set of graph database vertices, and wherein each vertex of the set of graph database vertices is associated with one or more edges of the set of graph database edges;
    determining, by one or more processors, an edge traversal value for one or more edges of the set of graph database edges, wherein the edge traversal value for a respective edge relates to a number of times that the respective edge is traversed in response to one or more queries of the graph database, and wherein the edge traversal value for a respective edge resets when the respective edge reaches a certain age;
    calculating, by one or more processors, a first vertex score for a first vertex on a first graph partition on a first computer, based, at least in part, on the edge traversal value(s) for one or more interpartition edges associated with the first vertex and not on the edge traversal value(s) for intrapartition edges; and
    responsive to determining that the first vertex score is above a predetermined threshold, migrating, by one or more processors, the first vertex to a second graph partition on a second computer.

2. The method of claim 1, further comprising:
    performing, by one or more processors, additional calculations of vertex scores and additional migrations of vertices over a time period, wherein the partitioned graph database is operational during the time period.

3. The method of claim 1, wherein:
    the partitioned graph database includes information pertaining to a social media network;

each vertex pertains to a user of the social media network; and each edge pertains to a connection between users of the social media network.

4. The method of claim 1, wherein the edge traversal value is determined based on a sampling of a subset of the edge traversals performed in response to the one or more queries of the graph database.

5. A computer program product comprising a computer readable storage medium having program instructions stored thereon, wherein the computer readable storage medium is not a transitory signal per se, wherein the program instructions are executable by a processor, and wherein the program instructions comprise:

program instructions programmed to identify a graph database partitioned across multiple computers in a clustered computing environment, wherein the graph database includes, as data structures for storing data in the database, a set of graph database edges and a set of graph database vertices, and wherein each vertex of the set of graph database vertices is associated with one or more edges of the set of graph database edges;

program instructions programmed to determine an edge traversal value for one or more edges of the set of graph database edges, wherein the edge traversal value for a respective edge relates to a number of times that the respective edge is traversed in response to one or more queries of the graph database, and wherein the edge traversal value for a respective edge resets when the respective edge reaches a certain age;

program instructions programmed to calculate a first vertex score for a first vertex on a first graph partition on a first computer, based, at least in part, on the edge traversal value(s) for one or more interpartition edges associated with the first vertex and not on the edge traversal value(s) for intrapartition edges; and program instructions programmed to, responsive to determining that the first vertex score is above a predetermined threshold, migrate the first vertex to a second graph partition on a second computer.

6. The computer program product of claim 5, further comprising:

program instructions programmed to perform additional calculations of vertex scores and additional migrations of vertices over a time period, wherein the partitioned graph database is operational during the time period.

7. The computer program product of claim 5, wherein:
the partitioned graph database includes information pertaining to a social media network;
each vertex pertains to a user of the social media network; and
each edge pertains to a connection between users of the social media network.

8. The computer program product of claim 5, wherein the edge traversal value is determined based on a sampling of a subset of the edge traversals performed in response to the one or more queries of the graph database.

9. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to identify a graph database partitioned across multiple computers in a clustered computing environment, wherein the graph database includes, as data structures for storing data in the database, a set of graph database edges and a set of graph database vertices, and wherein each vertex of the set of graph database vertices is associated with one or more edges of the set of graph database edges;

program instructions programmed to determine an edge traversal value for one or more edges of the set of graph database edges, wherein the edge traversal value for a respective edge relates to a number of times that the respective edge is traversed in response to one or more queries of the graph database, and wherein the edge traversal value for a respective edge resets when the respective edge reaches a certain age;

program instructions programmed to calculate a first vertex score for a first vertex on a first graph partition on a first computer, based, at least in part, on the edge traversal value(s) for one or more interpartition edges associated with the first vertex and not on the edge traversal value(s) for intrapartition edges; and program instructions programmed to, responsive to determining that the first vertex score is above a predetermined threshold, migrate the first vertex to a second graph partition on a second computer.

10. The computer system of claim 9, wherein the program instructions further include:
program instructions programmed to perform additional calculations of vertex scores and additional migrations of vertices over a time period, wherein the partitioned graph database is operational during the time period.

11. The computer system of claim 9, wherein:
the partitioned graph database includes information pertaining to a social media network;
each vertex pertains to a user of the social media network; and
each edge pertains to a connection between users of the social media network.

12. The computer system of claim 9, wherein the edge traversal value is determined based on a sampling of a subset of the edge traversals performed in response to the one or more queries of the graph database.

* * * * *